Feb. 20, 1934.  E. SCHWEITZER  1,947,923
DEVICE FOR MEASURING THE RATIO OF THE INGREDIENTS
IN A MIXTURE OF GASES OR LIQUIDS
Filed April 29, 1932
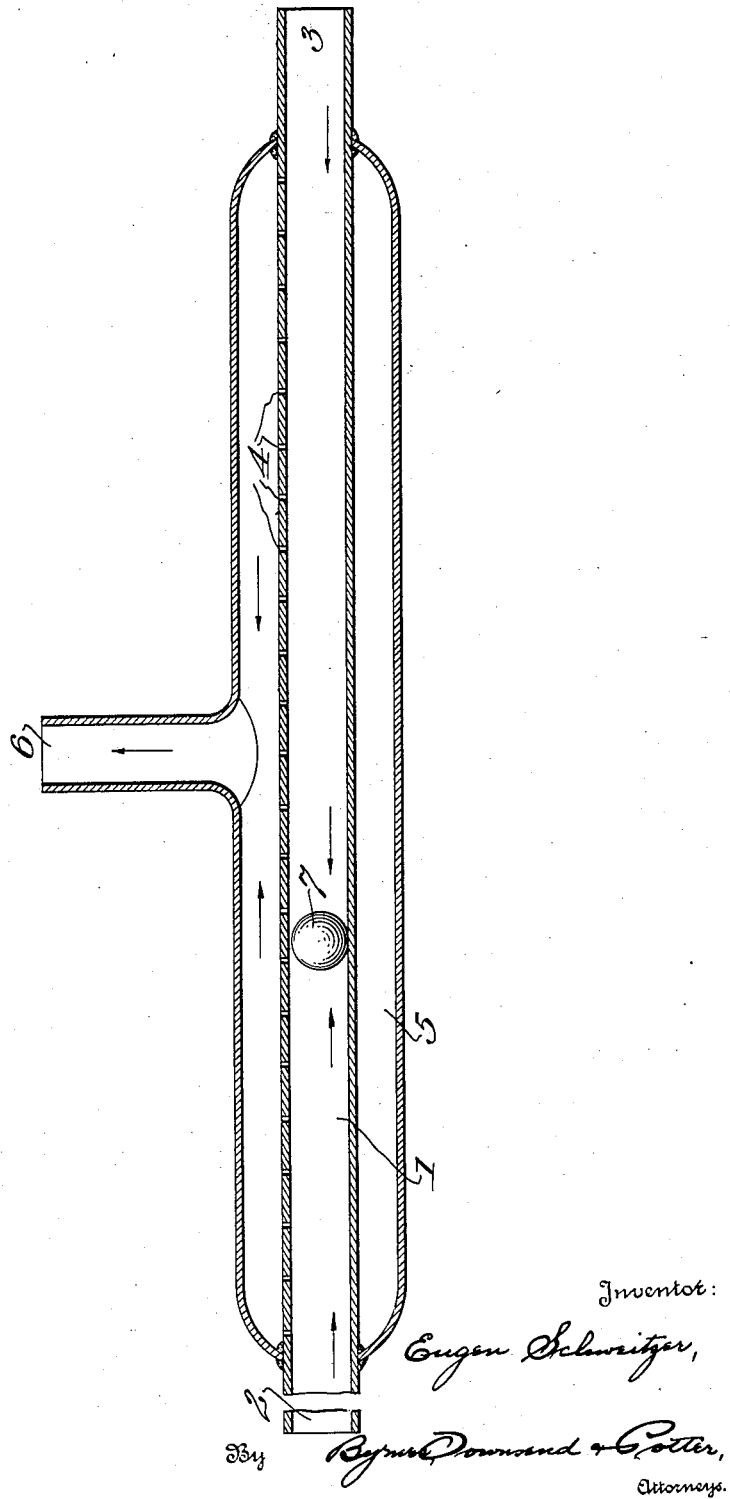
Inventor:
Eugen Schweitzer,
By Byrne Townsend & Potter,
Attorneys.

Patented Feb. 20, 1934

1,947,923

UNITED STATES PATENT OFFICE 1,947,923

DEVICE FOR MEASURING THE RATIO OF THE INGREDIENTS IN A MIXTURE OF GASES OR LIQUIDS

Eugen Schweitzer, Frankfort - on - the - Main, Germany, assignor to I. G. Farbenindustrie Aktiengesellschaft, Frankfort - on - the - Main, Germany Application April 29, 1932, Serial No. 608,332, and in Germany May 8, 1931

2 Claims. (Cl. 73—68)

The present invention relates to a device for measuring the ratio of ingredients in a mixture of gases or liquids.

This device comprises the combination of a horizontal cylindrical inner tube having perforations spaced longitudinally of the tube, two inlets in said tube for the two gases or liquids at its opposite ends, a jacket tube surrounding said perforated inner tube and provided with an outlet, a ball in said inner tube adapted to move within said inner tube, said ball having a diameter but a little smaller than the inner diameter of the inner tube, so that, when the two gases or liquids are introduced at the two inlet openings, the position of the movable ball depends on the mixing proportion of the two gases or liquids.

In the annexed drawing one form of construction of the device according to this invention is represented schematically.

The drawing shows a section through a device for measuring the mixing proportion of two gases. 1 is the measuring tube having inlets 2 and 3 and being provided with openings 4. These openings may be located at the upper part of the tube wall and spaced longitudinally of tube 1 at equal distances from one another. 5 is the jacket tube having the outlet opening 6. 7 is the float in the form of a ball. The one gas enters at 2 and the other gas enters at 3. Through the openings 4 the gases penetrate into the jacket tube and leave the device at 6.

For measuring the mixing proportion of two liquids or gases the one current of gas or liquid is caused to enter the tube 1 through the inlet 2, while the other current of gas or liquid is caused to enter through the inlet 3. Through the openings 4 the current passes into the jacket tube 5. The ball inserted in the tube 1 is in equilibrium at that point within the tube at which the pressures produced by the two currents to be measured are equalized. If both currents to be measured are increased or diminished without changing their mixing proportion, this alteration of the total quantity is without influence on the position of the ball. The measuring tube, therefore, may be calibrated in per cent. Thus it is possible to measure and control in the simplest manner the mixing proportion of two currents irrespective of the total quantity of gas.

By varying the size of the openings and the distances between the openings of the measuring tube any measuring range can be obtained. Thus by arranging a great number of openings or giving the openings a particularly large form, great quantities of gas per second can be measured, while for the accurate measuring of slight quantities of gas the inner tube must be provided with a few openings only or with particularly narrow openings.

The measuring and jacket tubes may be made of any suitable material, for instance of glass. The device is suitable for determining the proportion of mixture of gases and liquids of any kind, such as for mixing and measuring narcotic gases, especially for a narcotic gas mixture composed of laughing gas and oxygen.

I claim:

1. A device for measuring the mixing proportion of two gases or liquids comprising the combination of a horizontal, cylindrical inner tube having perforations spaced longitudinally of the tube, two inlets in said inner tube for the two gases or liquids at its opposite ends, a jacket tube surrounding said inner tube and provided with an outlet and a ball in said inner tube adapted to move within said inner tube and having a diameter that is a little smaller than that of the inner tube, so that, when the two gases or liquids are introduced through the inlet openings, the position of the movable ball depends on the mixing proportion of the two gases or liquids.

2. A device for measuring the mixing proportion of two gases or liquids comprising the combination of a horizontal, cylindrical inner tube having perforations spaced longitudinally of the tube in its upper part, two inlets in said inner tube for the two gases or liquids at its opposite ends, a jacket tube surrounding said inner tube and provided with an outlet and a ball in said inner tube adapted to move within said inner tube and having a diameter that is a little smaller than that of the inner tube, so that when the two gases or liquids are introduced through the inlet openings, the position of the movable ball depends on the mixing proportion of the two gases or liquids.

EUGEN SCHWEITZER.